United States Patent [19]

Oosaka et al.

[11] 4,247,197
[45] Jan. 27, 1981

[54] FILM POSITIONING DEVICE FOR MICROFORM PRINTING SYSTEM

[75] Inventors: Shigenori Oosaka; Makoto Murakoshi, both of Asaka, Japan

[73] Assignee: Fuji Photo Film Co., Ltd., Minami-ashigara, Japan

[21] Appl. No.: 959,850

[22] Filed: Nov. 13, 1978

[51] Int. Cl.³ .............................................. G03B 27/44
[52] U.S. Cl. ........................................ 355/54; 355/72
[58] Field of Search ............................. 355/53, 54, 72

[56] References Cited

U.S. PATENT DOCUMENTS

| | | | |
|---|---|---|---|
| 3,591,282 | 7/1971 | Renold | 355/54 |
| 3,746,444 | 7/1973 | Kahle et al. | 355/54 X |
| 3,782,819 | 1/1974 | Kanayama et al. | 355/54 |
| 3,796,489 | 3/1974 | Sone et al. | 355/54 |
| 3,910,698 | 10/1975 | Sone et al. | 355/54 |
| 4,134,675 | 1/1979 | Oosake et al. | 355/54 |

*Primary Examiner*—Richard A. Wintercorn
*Attorney, Agent, or Firm*—Gerald J. Ferguson, Jr.; Joseph J. Baker

[57] ABSTRACT

Microfilm carried by a microfilm carrier is moved in a horizontal plane so that a selected area of the microfilm is presented to a film aperture of a microform printing system. The microfilm carrier includes a sliding spacer fixed thereto sliding along a base plate in which the film aperture is formed. The sliding spacer maintains a predetermined distance between the carrier and the base plate during movement of the carrier.

4 Claims, 6 Drawing Figures

FILM POSITIONING DEVICE FOR MICROFORM PRINTING SYSTEM

BACKGROUND OF THE INVENTION

1. Field of the Invention

This invention relates to a film positioning device for a microform printing system, and more particularly to a two-dimensional film positioning device for a microform printing system which moves a film in X and Y directions in a horizontal plane to permit recording of information in a selected one of a plurality of two-dimensionally arranged recording frames of the film.

2. Description of the Prior Art

As is well known in the art, a large number of microimages are recorded in an extremely limited area on a microfilm. Accordingly, precise positioning of the film relative to the optical axis of a taking lens system of a microform recording system is required when recording information. In the microform recording system, the taking lens systems is generally supported in a fixed position and the film is moved relative to the optical axis of the fixed taking lens system, since such an arrangement is preferred to precisely position the film or its recording frames relative to the optical axis of the taking lens system. Specifically a microfilm of 105 mm width has a large number of recording frames arranged in rows and columns. Therefore the 105 mm microfilm is required to be moved with respect to the taking lens system in two directions, i.e. in X and Y directions.

In a microform recording system combined with an electronic computer generally referred to as COM (Computer Output Microfilmer), a binary coded computer output is recorded as a microimage in a designated recording frame of a microfilm. The electronic computer gives outputs at an extremely high speed. In order to make better use of the speed of the computer, the COM should also operate with a high speed. The operational speed of the COM depends not only upon the recording speed of the computer output, but also upon the moving speed of the film from one recording frame to another.

Further it is desired that the film not be vibrated during recording of data thereon, since otherwise the quality of the recorded microimages is lowered.

Thus, there has been a strong demand for a film positioning device for a microfilm printing system capable of moving a microfilm from one position to another with a high speed and high precision without considerable vibration of the film.

SUMMARY OF THE INVENTION

Accordingly, the primary object of the present invention is to provide a two-dimensional film positioning device for a microfilm printing system capable of moving a microfilm in a horizontal plane with high speed and great precision with reduced vibration of the film relative to the taking lens system of the microform printing system.

The two-dimensional film positioning device of this invention comprises a flat base plate, a microfilm carrier, a sliding spacer fixed to the microfilm carrier for supporting the carrier at a constant distance from said flat base plate, a film feeding means to feed said microfilm relative to said carrier and a carrier driving means controlled by electric signals to move the carrier in X and Y directions.

DESCRIPTION OF THE PREFERRED EMBODIMENT

Figure 1:
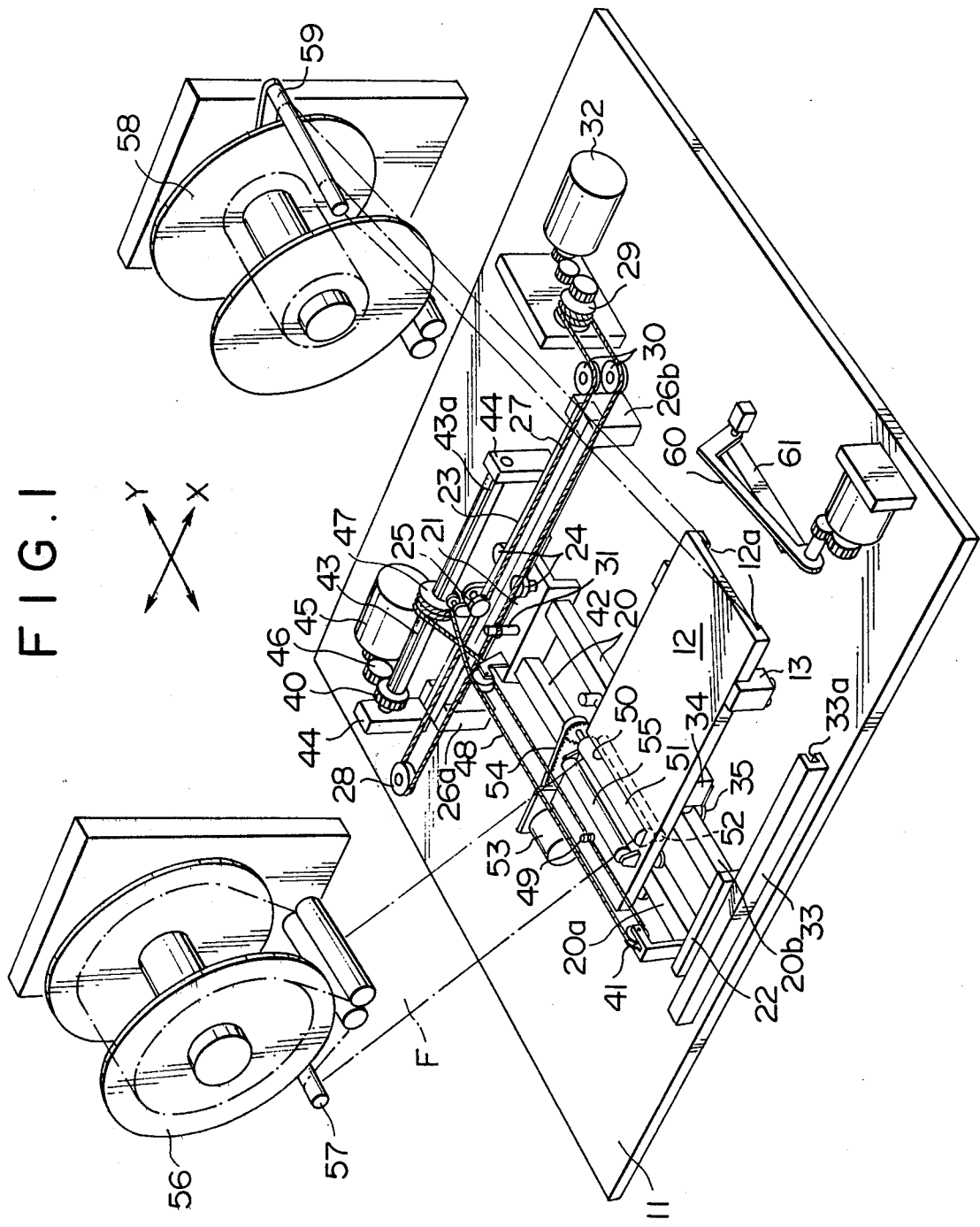
FIG. 1 is a perspective view showing a film positioning device in accordance with an embodiment of the present invention.

FIG. 1 is a perspective view of a two-dimensional film positioning device in accordance with an embodiment of this invention.

In FIG. 1 the film positioning device of this embodiment includes a flat base plate 11 formed of rigid material such as stainless steel. A microfilm carrier 12 is mounted on the flat base plate 11 for sliding movement along the upper surface thereof. The base plate 11 is provided with a film aperture (not shown) through which microimages are recorded on recording frames of a film presented to the aperture. The carrier 12 is intermittently moved in X-direction and Y-direction along the upper surface of the base plate 11 to present new recording frames to the aperture. The carrier 12 is supported by a plurality of sliding spacers 13 which keep constant the space between the carrier 12 and the base plate 11 during sliding movement of the carrier 12. The carrier 12 is operatively connected to and slidably supported on a pair of Y-directional guide bars 20 (first and second Y-directional guide bars 20a, 20b) which are rectangular in cross section and extend in parallel to each other between a main bracket 21 and a sub-bracket 22. The Y-directional guide bars 20 are secured at one end to the main bracket 21 and at the other end to the sub-bracket 22 and are moved together with the brackets 21 and 22 in X-direction.

The main bracket 21 is slidably supported on a first X-directional guide bar 23 by means of a plurality of rollers 24 and a pulley 25 as will be described hereinbelow. The first X-directional guide bar 23 is supported at its ends by a pair of supporting members 26a, 26b fixed to and projecting from the base plate 11, and extends in parallel to the base plate 11 spaced therefrom. The main bracket 21 extends across the first X-directional guide bar 23 therebelow. Said rollers 24 are fixed to and extend upward from the main bracket 21 on opposite sides of the first X-directional guide bar 23 and are pressed against the respective sides thereof.

A trailing wire 27 extends in two runs in parallel to the first X-directional guide bar 23 between a pulley 28 and a driving pulley 29 through a pair of intermediate pulleys 30. The wire 27 is connected to the main bracket 21 through a pin 31 fixed thereto. The driving pulley 29 is driven by a motor 32 to move the main bracket 21 back and forth by the wire 27.

Said sub-bracket 22 is slidably supported on a second X-directional guide bar 33 which extends in parallel to said first X-directional guide bar 23. More specifically, the sub-bracket 22 is provided with rollers (not shown). The rollers rest on the lower surface of a channel 33a provided on the inner side of the second X-directional guide bar 33 and roll along the lower surface of the channel 33a when the sub-bracket 22 is moved back and forth together with the main bracket 21.

Figure 2:
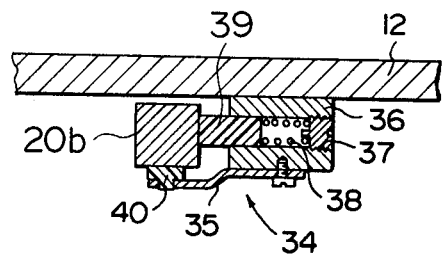
FIG. 2 is a fragmentary cross sectional view of FIG. 1 for illustrating a friction damper and a plate spring attached to a microfilm carrier.

Said carrier 12 has a plurality of rollers on either side of Y-directional guide bars 20, which rollers are pressed against the respective sides of Y-directional guide bars 20. The carrier 12 is further provided with a friction damper 34 and a plate spring 35 on the side of the second Y-directional guide bar 20b remote from the first Y-directional guide bar 20a. As shown in more detail in FIG. 2, the friction damper 34 includes a housing 36 which has a bore 37 and is fixed to the lower surface of the carrier 12. A coil spring 38 and a sliding element 39 are received in the bore 37. The sliding element 39 is slidable along the bore 37 and pressed against the side face of the second Y-directional guide 20b remote from the first Y-directional guide bar 20a under the force of the spring 38. The sliding element 39 slides along the second Y-directional guide bar 20b being pressed thereagainst when the carrier 12 is moved in Y-direction, whereby vibration of the carrier 12 is reduced. Said plate spring 35 is secured at its one end to the lower surface of the housing 36 and is provided with a sliding element 40 at the other end thereof. The spring plate 35 imparts a pressure through the sliding element 40 to the second Y-directional guide bar 20b from below, thereby urging the carrier 12 downward. The sliding element 40 slides along the second Y-directional guide bar 20b and also reduces vibration of the carrier 12 during sliding movement of the carrier 12.

As can be seen from the above description, the carrier 12 can move relative to the Y-directional guide bars 20 only in the direction parallel thereto.

A pair of pulleys 41 and 42 are disposed adjacent to the sub-bracket 22 and the other on the main bracket 21. They are aligned with each other in Y-direction. An elongated spline shaft 43 extends in parallel to said first X-directional guide bar 23 and is supported at its ends by a pair of support members 44. A gear 40 is secured to the spline shaft 43 near one end thereof. The spline shaft 43 is rotated by a motor 45 through the gear 40 and an intermediate gear 46. A pulley 47 having a center bore is supported by the spline shaft 43 with its center bore receiving the spline shaft 43. Grooves (not shown) extending in parallel to the axis of the center bore are formed on the inner face of the pulley 47. The grooves are engaged with protrusions 43a formed on the outer surface of the spline shaft 43 to extend in parallel to the axis thereof. By the engagement therebetween rotation of the pulley 47 relative to the spline shaft 43 is prevented. However, sliding movement of the pulley 47 along the length of the spline shaft 43 is permitted.

A trailing wire 48 is wound around the pulley 47 and extends in two runs between the pulleys 41 and 47 via the pulley 42. The wire 48 is fixed to the carrier 12 through a fixed pin 49. Therefore, when the pulley 47 is rotated and the wire 48 is pulled, the carrier 12 is moved in Y-direction along the Y-direction guide bars 20 toward the main bracket 21 or the sub-bracket 22 according to the rotating direction of the pulley 47.

Said electric motors 32 and 45 may be pulse motors or servo motors which are rotatable in both directions by a controlled number of rotations controlled by suitable electric signals.

With the arrangement described above, the carrier 12 is moved horizontally in the X-direction and the Y-direction driven by the respective electric motors 32 and 45 through respective wires 27 and 48. When the carrier 12 is moved, the sliding spacer 13 slides along the upper surface of the base plate 11, and maintains the predetermined distance between the carrier 12 and the base plate 11, thereby keeping a predetermined distance between the film which is supported by the carrier 12 as described hereinbelow and a taking lens system of a microform printing system.

The carrier 12 is provided with a laterally extending slot 50 adjacent to said Y-directional guide bars 20. A pair of film feeding rollers 51 and 52 are received in the slot 50. The rollers 51 and 52 are vertically aligned and in contact with each other. The roller 51 is operatively connected with an electric motor 53 through a timing belt 54. The motor 53 is fixed to the carrier 12 and moves together therewith. A film guide roller 55 is mounted on the upper surface of the carrier 12 adjacent to the roller 51.

Film F is supplied to the lower surface of the carrier 12 from a supply reel 56 via dancer roller 57 and the guide roller 55 and between said pair of feeding rollers 51 and 52. The film F is further advanced along the lower surface of the carrier 12 with its side edges engaged with channels 12a formed in the lower surface of the carrier 12 near the side edges thereof. The film F is supported flat on the lower surface of the carrier 12 with suction created by evacuating the inside of the carrier 12 by means of a vacuum pump connected thereto by way of a flexible conduit not shown.

The film F is moved together with the carrier 12 until the exposure of recording frames within one microfiche finish. When one microfiche of recording is finished, the film F is advanced in X-direction relative to the carrier 12 by a length corresponding to one microfiche by means of said feeding rollers 51 and 52. When it is desired that the exposed part of the film be in the form of roll film, the part of the film discharged from the carrier 12 may be taken up by a film take-up reel 58 through a dancer roller 59. When it is desired that the exposed part of the film be cut off into a sheet, the part of the film discharged from the carrier 12 is passed between upper and lower blades 60 and 61 of a cutter means which is of well known structure. In the latter case, the carrier 12 is moved toward the cutter means until its front edge is positioned adjacent to the cutter means prior to the advancement of the film. When the film F is advanced relative to the carrier 12, said evacuation to create suction to hold the film F is stopped.

Said sliding spacer 13 is preferred to be made of plastics with low expansion coefficient. The shape of the lower surface of the sliding spacer 13 in contact with the base plate 11 is preferred to be circular so that frictional force between the lower surface of the sliding spacer 13 and the upper surface of the base plate 11 is substantially constant regardless of the sliding direction of the carrier 12. The frictional force between the sliding spacer 13 and the base plate 11 serves to reduce vibration of the carrier 12 during the movement thereof. The frictional force is increased by the plate spring 35. Further, said friction damper 34 also serves to reduce vibration of the carrier 12.

In this embodiment, wires 27 and 48 are employed to transmit the driving force of the respective electric motors 32 and 45. Wire is advantageous over such other driving means as a lead screw in that it is not only relatively easy to assemble or disassemble but also reduces vibration of the carrier 12.

In the film positioning device of this embodiment, vibration of the carrier is sufficiently small. Therefore, the quality of microimages recorded on the film is not lowered even when the recording is effected immediately after the movement of the carrier 12 and, therefore, recording time can be substantially reduced. As can be seen from FIG. 1, the driving mechanism of the carrier 12 occupies only a part of the carrier 12 and the remaining part of the carrier 12 is used as the recording stage. Therefore if the remaining part of the carrier 12 is transparent, the microimages which are being recorded or have just been recorded can be viewed therethrough by using a suitable optical system.

Figure 3:
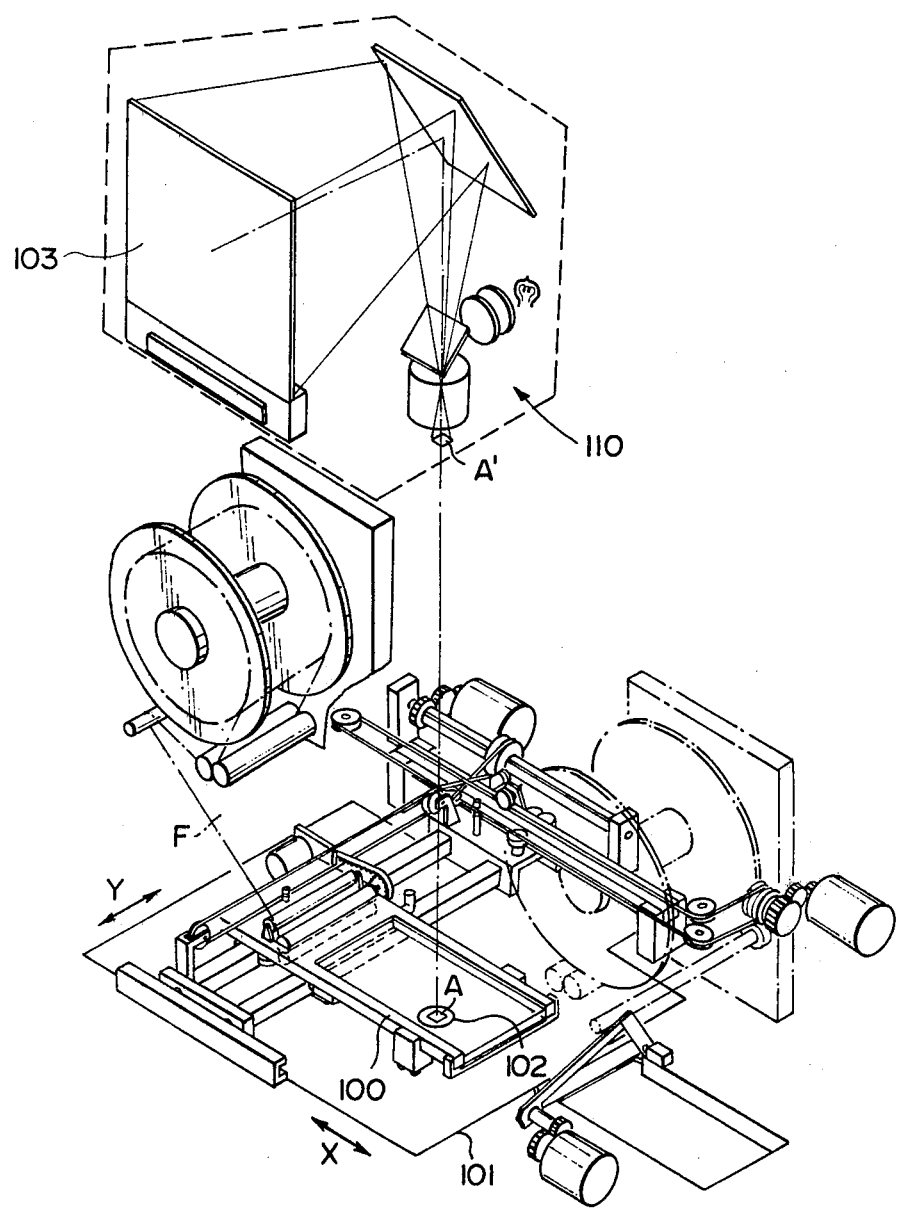
FIG. 3 is a perspective view illustrating a microform printing system employing a film positioning device in accordance with another embodiment of the present invention.

FIG. 3 is a perspective view illustrating a microform printing system employing a film positioning device in accordance with another embodiment of this invention in which said remaining part of the carrier is transparent so that microimages just recorded can be viewed therethrough.

In FIG. 3, the film positioning device employed is almost the same as that of FIG. 1 except for the carrier.

In the illustrative microform printing system, there is used a special recording medium carrying a recording layer whose transmittance varies when it is exposed to a highly concentrated radiation energy beam such as a laser beam. When such a recording medium is used, the recorded microimage is made visible at once.

Such a microform printing system has been disclosed in Japanese Patent Application No. 31353/1977.

In FIG. 3, a carrier 100 is modified to be adapted to such a microform printing system. Thus, a part 100a of the carrier 100 corresponding to the recording stage is made of transparent material such as PMMA (Polymethyl methacrylate) or glass, the latter being preferred since the former is apt to be scratched.

A base plate 101 has a film aperture 102 through which an area of film F presented to the taking lens is scanned by, for example, a laser beam to form a microimage as indicated by A. The microimage A is projected on a screen 103 by means of a projecting optical system 110.

Figure 4A:
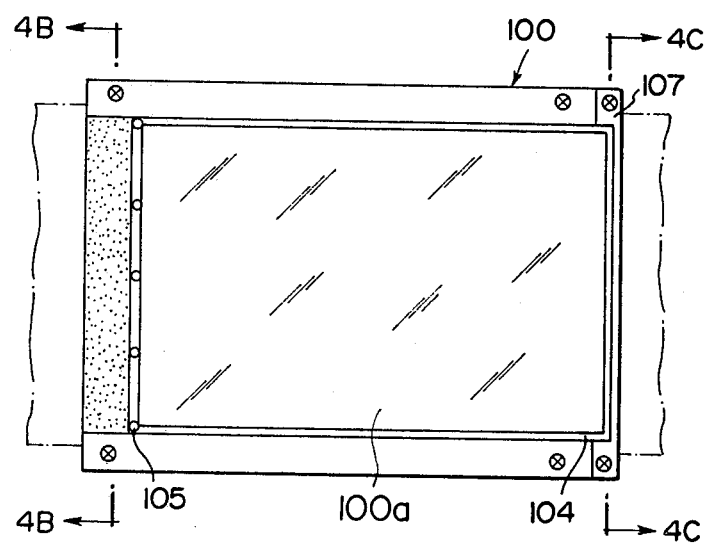
FIG. 4A is a fragmentary bottom view of the carrier employed in the system of FIG. 3.
Figure 4B:
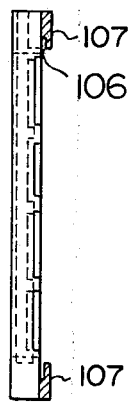
FIG. 4B is a cross sectional view taken along line 4B—4B of FIG. 4A.
Figure 4C:
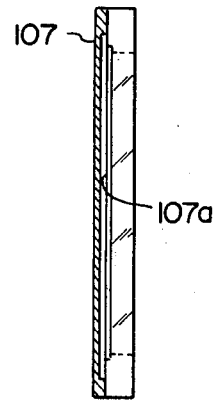
FIG. 4C is a cross sectional view taken along line 4C—4C of FIG. 4A.

The film F is fed to the carrier 100 in the same manner as in the film positioning device of FIG. 1. However, in case of the carrier 100, it is unsuitable to dispose a suction means for making the film F lie flat on the lower surface of the carrier 100 in the area corresponding to the recording stage. Accordingly, as shown in FIG. 4A, the carrier 100 is provided with a suction groove 104 around the recording stage or the transparent part 100a. The suction groove 104 is provided with a suction force for supporting the film by a vacuum pump (not shown) through a plurality of suction holes 105 disposed therewithin. Instead of such arrangement, a plurality of suction holes may be disposed around the transparent part 100a. Generally, the suction force exerted by the suction means which is disposed along the circumference of the recording stage is not sufficient to support the film F flat against the weight of the film F or the torsional shearing force exerted on the film F when the carrier 100 is moved in the Y-direction.

In order to assist the suction groove 104 in supporting the film F, the carrier 100 is provided with a pair of guide channels 106 and a film holding member 107. The guide channels 106 are located adjacent to the film inlet end of the transparent part 104 of the carrier 100 and guide the film F to pass close by the lower surface of the carrier 100. The film holding member 107 which is in the form of a laterally extending slit in the illustrated embodiment is disposed at the film discharge end of the carrier 100 and supports the film F, passing through a slit 107a, against its weight and the torsional shearing force exerted thereon.

The film holding member may be in the form of a pair of rollers which nip the film F therebetween.

In FIG. 3 said projecting optical system is shown separated from the carrier 100 for simplification of the drawing. Actually, the microimages referenced by A and A' are the same.

We claim:

1. A film positioning device for a microform printing system for moving a microfilm in a horizontal plane so that a selected area of the microfilm is presented to a film aperture for recording, comprising a flat base plate, a microfilm carrier slidably disposed on the base plate for holding the microfilm on the base plate, a sliding spacer fixed to the carrier for supporting the carrier at a predetermined distance above the base plate, a film feed means for feeding the film relative to the carrier and a driving means for moving said carrier in X and Y-directions, said sliding spacer keeping said distance between the base plate and the carrier constant during movement of the carrier in X-and Y-directions and where the lower surface of the sliding spacer in contact with the base plate is circular and where said driving means comprises first and second parallel X-directional guide bars extending in X-direction spaced from each other, a main bracket slidable along the first X-directional guide bar, a sub-bracket slidable along the second X-directional guide bar, first and second parallel Y-directional guide bars extending in Y-direction between the main bracket and the sub-bracket, the opposite ends of each Y-directional guide bar being respectively secured to the main bracket and the sub-bracket, said carrier being operatively connected to the Y-directional guide bars and being slidable therealong, a first electric motor which rotates to move the main bracket back and forth together with said carrier along said first X-directional guide bar and a second electric motor which rotates to move the carrier back and forth along the Y-directional guide bars independent of said main bracket.

2. A film positioning device as defined in claim 1 wherein said first and second electric motors are operatively connected with the main bracket and the carrier respectively by trailing wires.

3. A film positioning device as defined in claim 2 wherein said electric motors are servo motors controlled by electric signals.

4. A film positioning device as defined in claim 2 wherein said electric motors are pulse motors controlled by electric signals.

* * * * *

UNITED STATES PATENT AND TRADEMARK OFFICE
CERTIFICATE OF CORRECTION

PATENT NO. : 4,247,197
DATED : January 27, 1981
INVENTOR(S) : SHIGENORI OOSAKA, ET AL.

It is certified that error appears in the above-identified patent and that said Letters Patent are hereby corrected as shown below:

IN THE HEADING OF THE PATENT, PLEASE INSERT THE FOLLOWING:

Foreign Application Priority Data

November 14, 1977    Japan. . . . . . . . .  136451/1977

May 23, 1978         Japan. . . . . . . . .  61470/1978

Signed and Sealed this

Nineteenth Day of May 1981

[SEAL]

Attest:

RENE D. TEGTMEYER

Attesting Officer    Acting Commissioner of Patents and Trademarks